United States Patent [19]
Rzechula

[11] Patent Number: 5,010,127
[45] Date of Patent: Apr. 23, 1991

[54] ADDITIVE COMPOSITION FOR TREATING WATER USED TO FORM ICE AND METHODS

[75] Inventor: Michael J. Rzechula, Elizabethtown, Ill.

[73] Assignee: Slcik Ice Limited, Elizabethtown, Ill.

[21] Appl. No.: 411,116

[22] Filed: Sep. 27, 1989

[51] Int. Cl.$^5$ ............................................... C08K 5/05
[52] U.S. Cl. ..................................... 524/379; 252/194; 524/556
[58] Field of Search ..................... 427/140; 252/194; 524/329, 556

[56] References Cited

U.S. PATENT DOCUMENTS

| | | | |
|---|---|---|---|
| 4,295,987 | 10/1981 | Parks | 252/194 |
| 4,384,988 | 5/1983 | Schoenholz et al. | 252/610 |
| 4,897,297 | 1/1990 | Zafinoglu | 112/420 X |
| 4,921,743 | 5/1990 | Hansen et al. | 428/102 |

Primary Examiner—Michael Lusignan
Attorney, Agent, or Firm—Wood, Phillips, Mason, Recktenwald & VanSanten

[57] ABSTRACT

The problems associated with patching, sealing and forming ice due to water run off and large imperfections on skating rinks is solved by the use of an additive for treating water which comprises a polymer selected from the group consisting of water gelling starches and polymers of acrylic acid and sodium salt commonly referred to as super absorbent polymers and means for dispersing the polymer in water. The polymer absorbs water, which may be tap water at a temperature in the range of 45°–55° F., producing a generally homogenous mixture with slush-like consistence, when mixed with the water. The mixture may then by applied where patching, sealing or the formation of ice is required. The frozen mixture formed has desirable characteristics for skating. The invention also encompasses novel methods for patching, sealing and forming ice.

17 Claims, No Drawings

ADDITIVE COMPOSITION FOR TREATING WATER USED TO FORM ICE AND METHODS

FIELD OF THE INVENTION

The present invention generally relates to water additives and more particularly is concerned with additives for treating water used in patching, sealing and forming ice.

BACKGROUND OF THE INVENTION

In maintaining the ice quality of an ice rink, the main concern is providing a smooth skating surface. Due to the action of skating and other causes, the ice surface may become rough due to mars or imperfections. The conventional method for maintaining a smooth ice skating surface is to use a resurfacing machine, such as a Zamboni®, which lays down water to form a new layer of ice.

One problem with resurfacing is that often the newly applied water will run off the skating surface near the edges thereof and therefore not provide the rink with an optimal surface. As an example, in forming a hockey rink, boards are normally used around the periphery of the ice layer. The boards, even when butted up closely together, still have seams where water may escape.

Another problem emerges in resurfacing if the imperfections on the skating surface are large, such as gashes or cracks. The relatively large quantity of water used to fill such gashes requires a much longer time to solidify than the usual thin film, thereby increasing down time for the rink. To avoid this problem, snow or ice shavings will be packed in these larger imperfections and then watered. This is a common practice in the industry. However, the physical characteristics of the resulting patch do not facilitate a good skating surface.

The present invention is directed to overcoming one or more of the above problems.

SUMMARY OF THE INVENTION

It is a principal object of this invention to provide an additive for water used to treat ice which will form a thick, generally homogenous mixture, thereby allowing the mixture to be easily placed where needed while still providing desirable physical characteristics for skating once frozen.

The principal object of the invention is achieved by a water treatment additive including a polymer selected from the group consisting of water gelling starches and acrylic acid and sodium salt polymers commonly referred to as super absorbent polymers, and means for dispersing the polymer in water.

This additive can be added to treat water used for forming ice, whether it be for patching imperfections or for sealing between the materials used for forming the base of a new ice rink, or for sealing around the rink at the base of the walls to retard water run off. The water additive mixture results in a thick dispersion which will not run and may be placed where needed. Importantly, the resulting frozen composition has characteristics nearly identical of that to just plain water thereby providing a surface suitable for skating.

According to a preferred embodiment of the invention, the means for dispersing the polymer in water may be ethyl alcohol and silicon dioxide and the composition of the additive is about 13.7 to 22.75 parts by weight of ethyl alcohol, about 1 to 2 parts by weight of silicon dioxide, and about 8.75 to 15.2 parts by weight of either a water gelling starch or a super absorbent polymer. Further, the silicon dioxide preferably has a surface area of about 325–400 square meters per gram, and may be fumed silica.

Primary alcohols other than ethyl alcohol may be used. Isopropyl alcohol and methyl alcohol, for example, also provide desired results.

The invention also encompasses novel processes for patching, sealing and forming ice.

Other objects and advantages will become apparent from the following description and accompanying claims.

Description of the Preferred Embodiment

This invention relates to a composition for treating water used in forming ice. Although the preferred embodiment will discuss the use of the composition in relation to ice rinks, it is not outside the scope of this invention that the composition be used to treat water used for forming ice in other situations.

In a preferred embodiment, the composition comprises about 13.7 to 22.75 parts by weight of ethyl alcohol, about 1 to 2.03 parts by weight of silicon dioxide, and about 8.7 to 15.2 parts by weight of either a polymer formed from acrylic acid and a sodium salt, commonly referred to as a super absorbent polymer, or a water gelling starch. In a particularly preferred embodiment, the composition comprises 13.7 to 16.81 parts by weight of ethyl alcohol, 1 to 1.5 parts by weight of fumed silicon dioxide having a surface area of 325–400 square meters per gram, and 8.75 to 11.25 parts by weight of a super absorbent polymer.

When the additive is mixed with water, which may be tap water having a temperature in the range of 45°–55° F., the water is thickened into a generally homogenous mixture with a slush-like consistency so that repairing the ice surface and preventing melted water or newly applied water from running off the rink is made possible.

Ethyl alcohol aids dispersion of the polymer in the water to be treated. It is believed that the ethyl alcohol wets the polymer particles allowing the water to easily surround each particle preventing clustering of the polymer, thereby promoting a relatively uniform dispersion of the polymer in the aqueous dispersion. Other primary alcohols, such as isopropyl and methyl also provide desired results.

The silicon dioxide is believed to help prevent the packing or settling out of the polymer, thus also promoting uniform dispersion of the polymer within the aqueous dispersion. While the silicon dioxide particulates may have different sizes, it is preferable to use silicon dioxide, or silica, having a surface area of 325–400 square meters per gram. Also, the silica need not necessarily be fumed silica.

To provide color in the areas to be covered, the composition may be enhanced with pigments such as titanium dioxide and/or other pigments.

While in the particularly preferred embodiment, a super absorbent polymer is used, water gelling starches can also be used effectively. The starch or polymer absorbs the water treated and helps to thicken the mixture as more water is absorbed while not interfering with the freezing ability of the water or deteriorating skating characteristics when frozen.

In treating the water, one part by volume of the particularly preferred additive composition is added to 40 to 64 parts by volume of water. As an example, to treat 320 to 512 ounces of water, or 2.5 to 4 gallons of water, approximately 8 ounces of the composition will be added. However, more or less water may be added to create a thinner or more viscous dispersion. The temperature of the water may be that of tap water, which is generally 45°-55° F. The water and additive dispersion, upon mixing, will thicken noticeably to the consistency of slush. Normally only a few minutes of mixing is required at most to produce the slush-like consistency. At that time, the thickened dispersion may be applied where needed.

This invention also encompasses novel processes for sealing, patching and forming ice using the mixture. The process for sealing, patching and forming ice using the additive comprises the steps of providing one part by volume of the additive as outlined above, mixing the additive with 40 to 64 parts by volume of water, and applying at least part of the dispersion where needed, which normally would be on a surface whose temperature is to be lowered below the freezing point of water and at a location to be patched or sealed or where ice is to be formed. The step of applying may be performed by pouring, for example. Once frozen, the water/additive mixture performs nearly identically with ice formed from ordinary water.

The foregoing detailed description is given for a clearness of understanding only and no unnecessary limitations are to be understood therefrom as modifications within the scope of the invention will be obvious to those skilled in the art.

I claim:

1. An additive for treating water used for forming ice comprising effective ice forming amounts of:
   a polymer selected from the group consisting of water gelling starches and polymers of acrylic acid and sodium salt, commonly referred to as super absorbent polymers;
   a primary alcohol; and
   silicon dioxide.

2. The composition as recited in claim 1 wherein the silicon dioxide is fumed silica having a surface area of about 325 to 400 square meters per gram.

3. An additive to treat water used for sealing, patching and forming ice comprising:
   (a) about 13.7 to 22.75 parts by weight of ethyl alcohol;
   (b) about 1 to 2 parts by weight of silicon dioxide; and
   (c) about 8.75 to 15.2 parts by weight of a polymer selected from the group consisting of water gelling starches and polymers of acrylic acid and sodium salts, commonly referred to as a super absorbent polymers.

4. The composition as recited in claim 3 wherein the silicon dioxide has a surface area of about 325 to 400 square meters per gram.

5. The composition as recited in claim 4 wherein the silicon dioxide is fumed silica.

6. An aqueous homogenous mixture used for sealing, patching or forming ice comprising:
   (a) 1 part by volume of an additive comprising
      (i) about 13.7 to 16.8 parts by weight of ethyl alcohol,
      (ii) about 1 to 1.5 parts by weight of fumed silicon dioxide having a surface area of about 325 to 400 square meters per gram, and
      (iii) about 8.75 to 11.25 parts by weight of a polymer formed from acrylic acid and a sodium salt commonly referred to as a super absorbent polymer; and
   (b) about 40 to 64 parts by volume of water.

7. A process for forming ice comprising:
   mixing a polymer selected from the group consisting of water gelling starches and polymers of acrylic acid and sodium salt, commonly referred to as super absorbent polymers, and means for dispersing the polymer in water, with sufficient water to form a thickened mixture; and
   applying at least a portion of the mixture to a surface whose temperature is to be lowered below the freezing point of water at a location where ice is to be formed.

8. The process as recited in claim 7 wherein the means for dispersing the polymer in water comprising ethyl alcohol and silicon dioxide.

9. The process as recited in claim 8 wherein the silicon dioxide is fumed silica having a surface area of 325 to 400 square meters per gram.

10. The process as recited in claim 7 wherein the step of mixing is performed using water having a temperature in the range of 45°-55° F.

11. A process for forming ice comprising:
    mixing an additive comprising about 13.7 to 22.75 parts by weight of a primary alcohol, about 1 to 2 parts by weight of silicon dioxide, and about 8.75 to 15.2 parts by weight of a polymer from the group consisting of water gelling starches and polymers of acrylic acid and sodium salt, commonly referred to as super absorbent polymers, with sufficient water to form a thickened mixture; and
    applying at least a portion of the mixture to a surface whose temperature is to be lowered below the freezing point of water at a location where ice is to be formed.

12. The process as recited in claim 11 wherein the step of mixing is performed using silicon dioxide having a surface area of 325 to 400 square meters per gram.

13. The process as recited in claim 12 wherein the silicon dioxide is fumed silica.

14. The process as recited in claim 11 wherein the step of mixing is performed using water having a temperature in the range of 45°-55° F.

15. The process as recited in claim 7 further including the step of freezing the portion of the mixture that has been applied to the surface.

16. The process as recited in claim 11 including the step of mixing about one part by volume of the additive and about 40 to 64 parts by volume of water.

17. The process as recited in claim 11 further including the step of freezing the portion of the mixture applied to said surface.

* * * * *